United States Patent
Opitz et al.

(10) Patent No.: US 9,742,461 B2
(45) Date of Patent: Aug. 22, 2017

(54) APPARATUS AND METHOD FOR NARROWBAND DATA TRANSMISSION BY MEANS OF A DSSS TRANSMISSION SYSTEM

(71) Applicant: Continental Automotive GmbH, Hannover (DE)

(72) Inventors: Martin Opitz, Regensburg (DE); Thomas Reisinger, Regenstauf (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/903,708

(22) PCT Filed: Jul. 3, 2014

(86) PCT No.: PCT/EP2014/064144
§ 371 (c)(1),
(2) Date: Jan. 8, 2016

(87) PCT Pub. No.: WO2015/003986
PCT Pub. Date: Jan. 15, 2015

(65) Prior Publication Data
US 2016/0164570 A1  Jun. 9, 2016

(30) Foreign Application Priority Data
Jul. 8, 2013 (DE) .................. 10 2013 213 295

(51) Int. Cl.
*H04L 27/18* (2006.01)
*H04B 1/707* (2011.01)

(52) U.S. Cl.
CPC ............. *H04B 1/707* (2013.01); *H04L 27/18* (2013.01)

(58) Field of Classification Search
CPC ................................. H04B 1/707; H04L 27/18
See application file for complete search history.

(56) References Cited

U.S. PATENT DOCUMENTS 5,852,638 A * 12/1998 Chen ..................... H04L 27/144
329/300
6,215,762 B1 * 4/2001 Dent ..................... H04B 1/707
370/208

(Continued)

FOREIGN PATENT DOCUMENTS

| CN | 1415157 A1 | 4/2003 | ............. H04J 13/04 |
| CN | 1581713 A | 2/2005 | ............. H04B 1/02 |

(Continued)

OTHER PUBLICATIONS

International Search Report and Written Opinion, Application No. PCT/EP2014/064144, 17 pages, Sep. 10, 2014.

(Continued)

*Primary Examiner* — Kenneth Lam
(74) *Attorney, Agent, or Firm* — Slayden Grubert Beard PLLC

(57) ABSTRACT

A system providing a spread spectrum and a narrowband data transmission may comprise a DSSS transmitter and a DSSS receiver. The DSSS transmitter may convert a bit succession ($d_i$) into a chip succession ($s_k$) using a chip sequence ($c_j$, $c_j'$) and send a succession of impulses ($s(t)$) corresponding to the chip succession ($s_k$). The DSSS receiver may receive impulses ($s(t)$) sent by the transmitter and filter the received impulses ($r(t)$) using a filter having an impulse response ($x(t)$) dependent on the chip sequence ($c_j$, $c_j'$). The chip sequence ($c_j$) may be a spread sequence. The narrowband data transmission may use chip sequence ($c_j'$) and a corresponding impulse response ($x(t)$) of the filter. The chip sequence ($c_j'$) does not comprise a succession having two directly successive arithmetic sign changes and an arithmetic sign change does not occur after the first and before the last chip in the chip sequence ($c_j'$).

10 Claims, 7 Drawing Sheets

(56) References Cited

U.S. PATENT DOCUMENTS

| | | | | |
|---|---|---|---|---|
| 6,621,857 | B1 | 9/2003 | Belotserkovsky et al. | 375/149 |
| 2004/0091034 | A1* | 5/2004 | Shiu | H04B 1/1027 |
| | | | | 375/227 |
| 2004/0258131 | A1 | 12/2004 | Margon | 375/130 |
| 2005/0041746 | A1* | 2/2005 | Rosen | H04B 1/7163 |
| | | | | 375/242 |

FOREIGN PATENT DOCUMENTS

| | | | | |
|---|---|---|---|---|
| CN | 1846357 A | 10/2006 | | H04B 1/69 |
| CN | 103036594 A | 4/2013 | | H04B 3/54 |
| WO | 02/067479 A2 | 8/2002 | | H04J 11/00 |
| WO | 2015/003986 A1 | 1/2015 | | H04B 1/707 |

OTHER PUBLICATIONS

Chinese Office Action, Application No. 201480039373.8, 11 pages, Sep. 27, 2016.
Baier, Alfred, "Open Multi-Rate Radio Interface Architecture Based on CDMA," Personal Communications: Gateway to the 21st Century. Conference Record, 2nd International Conference, vol. 2., IEEE, 5 pages, Oct. 12, 1993.
German Office Action, Application No. 102013213295.6, 11 pages, Feb. 22, 2017.

* cited by examiner

APPARATUS AND METHOD FOR NARROWBAND DATA TRANSMISSION BY MEANS OF A DSSS TRANSMISSION SYSTEM

CROSS-REFERENCE TO RELATED APPLICATIONS

This application is a U.S. National Stage application of International Application No. PCT/EP2014/064144 filed Jul. 3, 2014, which designates the United States of America, and claims priority to DE Application No. 10 2013 213 295.6 filed Jul. 8, 2013, the contents of which are hereby incorporated by reference in their entirety.

TECHNICAL FIELD

The present invention relates to the use of a DSSS transmission system (DSSS=direct sequence spread spectrum) for the narrowband transmission of data, particularly in the automotive sector.

BACKGROUND

Spread spectrum transmission systems (transmission systems based on frequency spreading) can be used in the automotive sector, for example, particularly for communication between vehicle and a mobile transceiver, which is usually arranged in a vehicle key. A transmitter in the vehicle key can be used for the remote control of different functions, for example for locking and unlocking the doors of the vehicle (this application is also called "keyless entry") and for remote-controlled starting of the motor, for activating the heating or air conditioning system, etc.

Remote control of some of these functions (e.g., activation of the independent vehicle heater or the air conditioning system) may employ a bidirectional data transmission by means of radio over relatively long distances (e.g., 2 to 4 km). Such applications are also called long range applications in the automotive sector.

In order to be able to attain the demanded ranges of 2 to 4 km (in the free field), relatively low data rates of approximately 2 kbit/s are usually used. The modulation method usually used in the automotive sector is frequency shift keying (FSK), or even Gaussian frequency shift keying (GFSK). Other modulation methods, for example amplitude shift keying (ASK), are also possible. Without further measures, conventional modulation techniques (e.g., frequency shift keying, FSK for short) result in correspondingly low RF bandwidths for the radio transmission on the basis of these low data rates.

In some countries (e.g., in the member states of the European Union), such "narrowband transmissions" are permitted up to an output power of +16.15 dBm EIRP (EIRP=equivalent isotropic radiated power). In other countries (e.g., in the USA), consistent "distribution" of the transmission power over a larger spectral bandwidth is prescribed in order to be able to transmit the required transmission powers (homologation limit: 30 dBm on 50 ohms, in practical application approximately 20 dBm). This requires the frequency spreading methods DSSS or FHSS (frequency hopping spread spectrum) (cf. FCC 15.249).

In order to comply with the different legal constraints in different countries (e.g., frequency spreading in the USA, narrowband transmission in Europe), different transmission systems (transmitter and receiver) may be necessary. For the narrowband transmission, the modulation method usually used in the automotive sector is frequency shift keying (FSK), particularly even Gaussian frequency shift keying (GFSK) at a data rate of approximately 2 kbit/s. Amplitude shift keying is also possible.

SUMMARY

An IC that is compatible for all countries must accordingly contain both transmission systems. The present disclosure provides a digital transmission method and a corresponding transmission system that is configurable both for wideband transmission (through frequency spreading) and for narrowband transmission. One embodiment of the present disclosure provides a system configurable both for spread spectrum data transmission and for narrowband data transmission. The system may include a DSSS transmitter designed to convert a bit succession to be transmitted into a chip succession using a chip sequence and to send a succession of impulses corresponding to the chip succession. The system may include a DSSS receiver designed to use a transmission channel to receive impulses sent by the transmitter, and to filter the received impulses using a filter. The filter may have an impulse response dependent on the chip sequence. For the spread spectrum data transmission the chip sequence that can be set may be a spread sequence. For the narrowband data transmission a chip sequence and a corresponding impulse response of the filter can be set, the chip sequence not comprising a succession having two directly successive arithmetic sign changes and, furthermore, an arithmetic sign change not occurring after the first chip and before the last chip in the chip sequence. Such a chip sequence has a narrow bandwidth in comparison with a wideband spread sequence.

The invention is explained in more detail below on the basis of the examples illustrated in the figures. The examples shown are not necessarily intended to be understood as restrictive for the invention, but rather importance is attached to explaining the principles on which the invention is based.

DETAILED DESCRIPTION

In the figures, like reference symbols denote like or similar components or signals having like or similar meanings.

Figure 1:
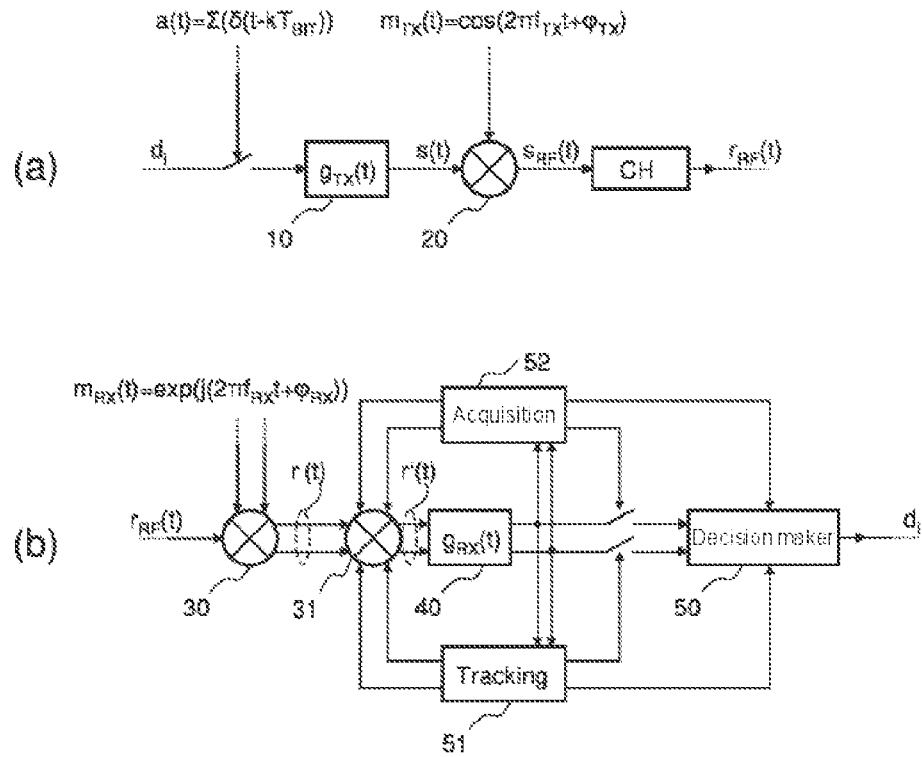
FIG. 1 is a block diagram of a transmission system for sending (a) using binary PSK modulation (phase shift keying) and receiving (b) the modulated signals according to teachings of the present disclosure.

FIG. 1 is a block diagram showing a model of data transmission for BPSK modulation (binary phase shift keying), which has been chosen as an example of a linear modulation method (e.g., QAM, PSK) according to teachings of the present disclosure. For each data symbol (bit) $d_i$, an impulse $g_{TX}(t)$ is transmitted. In the model shown in FIG. 1, this involves the symbol $d_i$, which can assume the values +1 and −1, being sampled periodically with a period duration $T_{BIT}$, and a Dirac impulse $\delta(t-k \cdot T_{BIT})$ being supplied in accordance with the polarity of the symbol $d_i$ to the filter 10, which then outputs its impulse response $g_{TX}(t)$ with a polarity that corresponds to the polarity of the symbol $d_i$. That is to say that at each sampling instant $k \cdot T_{BIT}$ (k is an integral time index) the filter 10 outputs the impulse response $g_{TX}(t-k \cdot T_{BIT})$ or $-g_{TX}(t-k \cdot T_{BIT})$ on the basis of the sample (+1 or −1). The sum of the time-staggered impulse responses yields the signal s(t) that is to be transmitted. This signal s(t) is converted into the radio frequency domain (RF domain) using the mixer 20, the output signal from the mixer being denoted by $s_{RF}(t)$. This signal $s_{RF}(t)$ reaches the receiver via the transmission channel (i.e. a radio link). The oscillator signal $m_{TX}(t)$, which is supplied to the mixer 20, has a (carrier) frequency $f_{TX}$ and a phase $\phi_{TX}$. This means that the spectrum of the signal $s_{RF}(t)$ is spectrally shifted in comparison with the spectrum of the signal s(t) by the absolute value of the carrier frequency $f_{TX}$. The block diagram of the transmitter described is shown in FIG. 1a, and the corresponding diagram of the receiver is shown in FIG. 1b.

The (radio frequency) signal $s_{RF}(t)$ transmitted via the channel CH is distorted by the transmission channel CH and overlaid with interference and noise on the way to the receiver. The received signal corresponding to the signal $s_{RF}(t)$ is denoted by $r_{RF}(t)$.

At the receiver end, the received signal $r_{RF}(t)$ is converted to baseband using a complex multiplication 30 (using the receiver-end nominal oscillator frequency, i.e. carrier frequency, $f_{RX}$).

The result of the complex multiplication 30 comprises an inphase signal $r_I(t)$ and a corresponding quadrature signal $r_Q(t)$, the two together being denoted as a complex signal $r(t)=r_I(t)+j \cdot r_Q(t)$ (j is the imaginary unit).

The mixer 30 is an example of (arbitrarily implemented) frequency conversion of the useful signal to baseband. This frequency conversion can be effected in one step (direct down conversion) or in a plurality of steps (having a plurality of successive (complex) multiplications).

At any rate, the spectral situation of the useful signal at the output of frequency conversion (i.e., the signal r(t)) has just one frequency error $f_E$. By way of example, this frequency error $f_E$ corresponds to the difference in the (carrier) frequency used at the transmitter and receiver ends for up conversion and down conversion, i.e., $f_E=f_{TX}-f_{RX}$. This comes about by virtue of the nominal transmission frequency (carrier frequency), in practice, being able to be provided only with finite accuracy both at the transmitter end and at the receiver end, meaning that the frequency normals used (for example quartz crystals), from which frequencies for up conversion and down conversion are derived, are defective.

The spectral situation of the useful signal at the output of the frequency conversion can have not only the frequency error $f_E$ but also further frequency error components that can arise as a result of the Doppler effect, for example, during the radio transmission via the channel CH.

In the case of coherent demodulation, a phase error $\phi_E=\phi_{TX}-\phi_{RX}$ must also be borne in mind. The mixer 30 thus quite generally represents the (single—or multistage) conversion of the received RF signal $r_{RF}(t)$ to baseband.

A second complex multiplication (mixer 31) is used to correct this (previously estimated) frequency error $f_E$. There then remains only the frequency error from the frequency estimation. The mixer 31 thus quite generally (regardless of the specific implementation) represents the correction of the aforementioned frequency error. When coherent demodulation is used, the phase error $\phi_E$ can also be corrected, for example using the mixer 31.

The output signal r'(t) (which is complex and, for the purposes of estimation accuracy, no longer contains frequency errors) from the second mixer 31 contains not only the aforementioned distortions and interference but also the time-staggered impulse responses $g_{TX}(t-k \cdot T_{BIT})$ and $-g_{TX}(t-k \cdot T_{BIT})$ corresponding to the transmission signal s(t). The signal r'(t) is supplied to a reception filter 40, the impulse response $g_{RX}(t)$ of which can match the transmitted impulses $g_{TX}(t)$. What is known as a "matched filter" is referred to. The data reception using matched filters is known per se and is therefore not explained in more detail. However, unlike in known theoretical contexts, simplifications are made, particularly at the receiver end, to the implementation (for example raised cosine in the transmitter, but rectangular shaping in the receiver).

The receiver from FIG. 1b additionally comprises an acquisition unit 52 that is designed to estimate or determine the aforementioned frequency error $f_E$ (also the phase error $\phi_E$ in the case of coherent demodulation). Furthermore, the acquisition unit 52 is designed to determine the phase of the spread sequence (in the case of DSSS mode) or of the modulation symbols, i.e. of the transmitted impulse responses $g_{TX}(t)$ (in the case of narrowband mode).

The acquisition unit 52 determines the frequency error $f_E$ (and if need be the phase error $\phi_E$) and also the phase of the spread sequence. The tracking unit 51 is designed to readjust the estimated frequency and phase errors $f_E$, $\phi_E$ for a change over time in the carrier frequencies $f_{RX}$, $f_{TX}$ and also in the corresponding phases $\phi_{RX}$, $\phi_{TX}$, and also for a change over time in the phase of the modulation symbols. Such a control loop is also called a "carrier tracking loop". Furthermore, the tracking unit 51 is also designed to readjust the estimated phase of the received modulation symbols. Such a control loop is also called a "symbol tracking loop" or "clock tracking loop". The control loops (and hence the tracking unit) do not necessarily have to be present, e.g. if the values estimated by the acquisition unit for the transmission of a frame are sufficiently accurate.

The task of the acquisition unit is thus (coarse) determination of the carrier frequency and the phases of the carriers and the spread sequence, but not control. The tracking is the first place where a closed control loop is usually used, to be precise there are two control loops, namely the aforementioned "carrier tracking loop" and "symbol tracking loop". This readjustment of the estimated phase and frequency errors and of the phase of the modulation symbols is known per se and is therefore not explained in more detail. The actual implementation is also of no great significance to the present invention.

The blocks shown in the figures (mixers, filters, acquisition unit, tracking unit, etc.) are intended to be understood not as a physical unit but rather purely as functional units. They can be implemented—depending on application—in very different ways. The mixers 5, 10, 30 and 31 represent a mathematical operation (possibly a complex multiplication). The acquisition and tracking units thus produce signals in the form $\exp(j(2\pi \cdot \Delta f \cdot t + \Delta\phi))$ for the respective mixer 31, which therefore performs a frequency conversion by $\Delta f$ and also a phase rotation by $\Delta\phi$. This complex multiplication is also an example of a wide variety of implementation options (for example with one or with two multipliers/mixers in any order).

The task of the acquisition unit 52 is also to find the correct (sampling) instants (bit and symbol limits) at which a decision (decision maker 50) relating to the value of a sent data symbol needs to be made. During the tracking, these instants are tracked by the tracking unit 51. The aforementioned frequency error $f_E$ (or even the carrier phase $\phi_{RX}$ in the case of coherent demodulation) of the useful signal is estimated by the acquisition unit 52 with such accuracy that the control loops in the tracking unit (PLL or FLL) can be started. Usually, as FIG. 1b shows, the frequency error is corrected by the matched filter 40 before the filtering.

Figure 2:
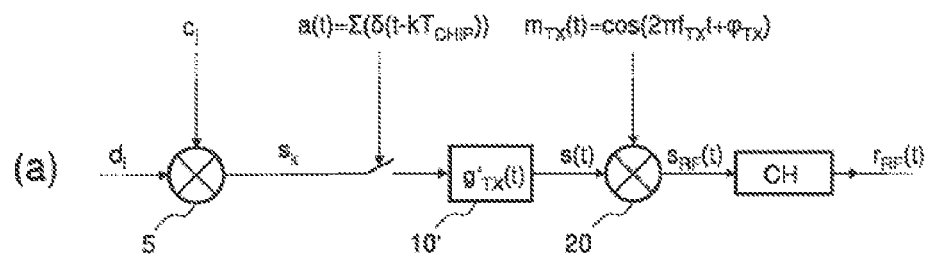
FIG. 2 is a block diagram with transmitter (a) and receiver (b and c) of a transmission system with DSSS modulation according to teachings of the present disclosure.
Figure 2:
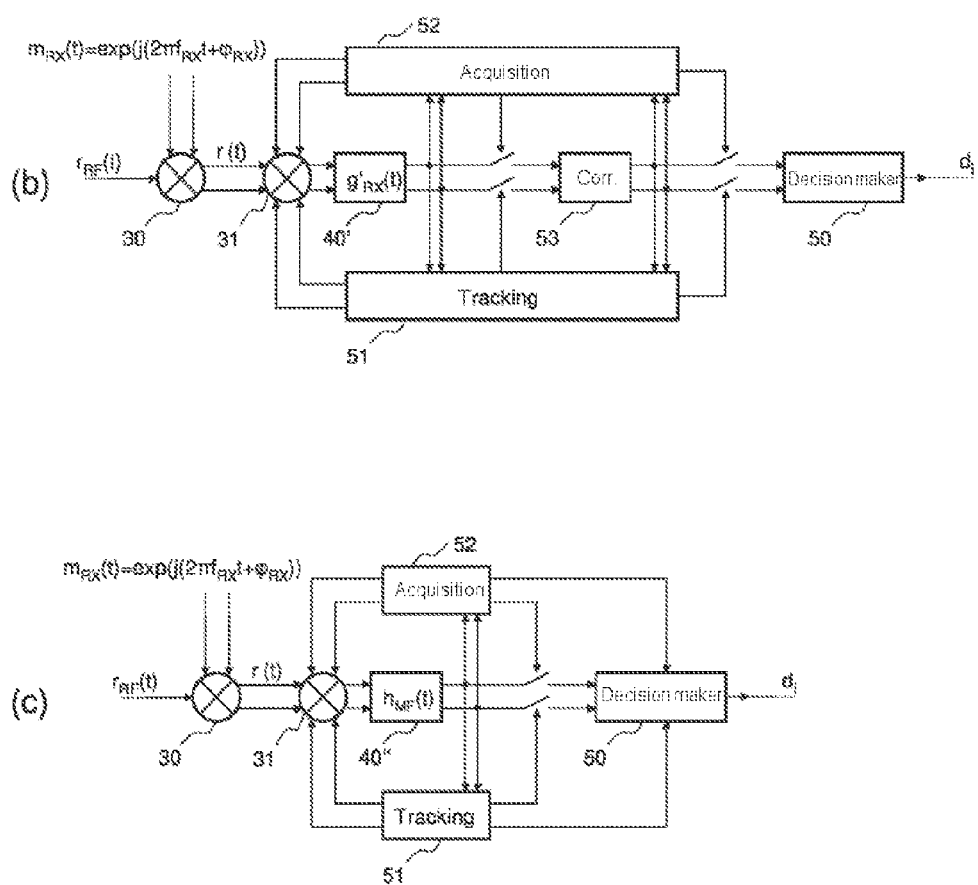

FIG. 2 shows a model of DSSS data transmission as a block diagram. FIG. 2a shows the transmitter, FIG. 2b shows the reception part. In the case of DSSS transmission, each data symbol (bit) $d_i$ is multiplied by the symbols $c_j$ of the spread sequence. The spread sequence has a length $L_C$, and the index j is computed as follows: $j = k \bmod L_C$, where k is a progressive index (k=0, 1, . . . ). For each bit, in accordance with the spread factor $L_C$, a number of $L_C$ "chips" are transmitted. The index i thus increases by an integer with every pass of the spread sequence of length $L_C$: $i = \lfloor k/L_C \rfloor$. The (modulation) symbol form of the chips is determined by the transmission impulse filter 10' (by the impulse response $g'_{TX}(t)$ thereof). In comparison with the transmitter from FIG. 1a, the chip succession is sampled at a rate that is higher by the factor $L_C$ (period $T_{CHIP} = T_{BIT}/L_C$).

Sending of the data at a chip rate $T_{CHIP}$ that is higher by a multiple of the bit rate $T_{BIT}$ also prompts—in accordance with the properties of the spread sequence—spreading of the spectrum of the transmission signal s(t) or $s_{RF}(t)$.

According to the receiver model shown as a block diagram in FIG. 2b, the receiver end first of all (as for the BPSK transmission shown in FIG. 1) mixes the received radio frequency signal $r_{RF}(t)$ with a nominal oscillator frequency $f_{RF}$ (mixer 30) and subjects the resultant (complex-value) mixer output signal r(r) to further mixing (mixer 31) in order to compensate for any frequency errors $f_E$ in the oscillator frequency $f_{RX}$ (in a similar manner to the example from FIG. 1b). As in the example from FIG. 1b, the demodulated received signal is denoted by r'(t) and contains the received succession of impulse responses $g_{TX}(t - k \cdot T_{CHIP})$ from the transmitter-end filter 40'. The demodulated received signal r'(t) is (likewise in a similar manner to the example from FIG. 1b) supplied to a matched filter 40' having the filter impulse response $g'_{RX}(t)$, which matches the impulse response $g_{TX}(t)$. The chip limits (i.e. the phase of the modulation symbols) are detected in a similar manner to the detection of the bit limits in the previous example (FIG. 1b) using the acquisition unit 52 and the tracking unit 51.

The output signal from the matched filter 40' is sampled in accordance with the chip rate $T_{CHIP}$, and the resultant chip sequence is correlated with the known spread sequence $c_j$ (correlator 53). The correlation result is supplied to the decision maker unit 50, which associates with the correlation result a bit succession $d_i$ that corresponds to the sent bit succession.

In order to simplify the complex detection of the chip limits, the matched filtering of the received chip symbols can be combined with subsequent correlation to form matched filtering (with a modified impulse response $h_{MF}(t)$ that is dependent on the spread sequence $c_j$). The resultant structure of the receiver is shown in FIG. 1c. On comparing FIGS. 1a and 2a and also FIGS. 1b and 2c, it can be seen that the BPSK transmission from FIG. 1 differs from the DSSS transmission from FIG. 2 at the transmitter end only by virtue of the multiplication (multiplier 5) of the bit succession $d_i$ that is to be transmitted by the spread frequency $c_j$ and at the receiver end only by virtue of the selection of the impulse response of the matched filter 40 or 40'.

As explained at the outset, it may be desirable to configure the same transmission system both for wideband (through frequency spreading) transmission and for narrowband transmission. For reasons of implementation efficiency (for example required chip area), however, there is no intention to change over from a DSSS receiver to a BPSK receiver. Rather, the intention is to use the DSSS receiver for receiving narrowband phase-modulated signals.

Figure 3:
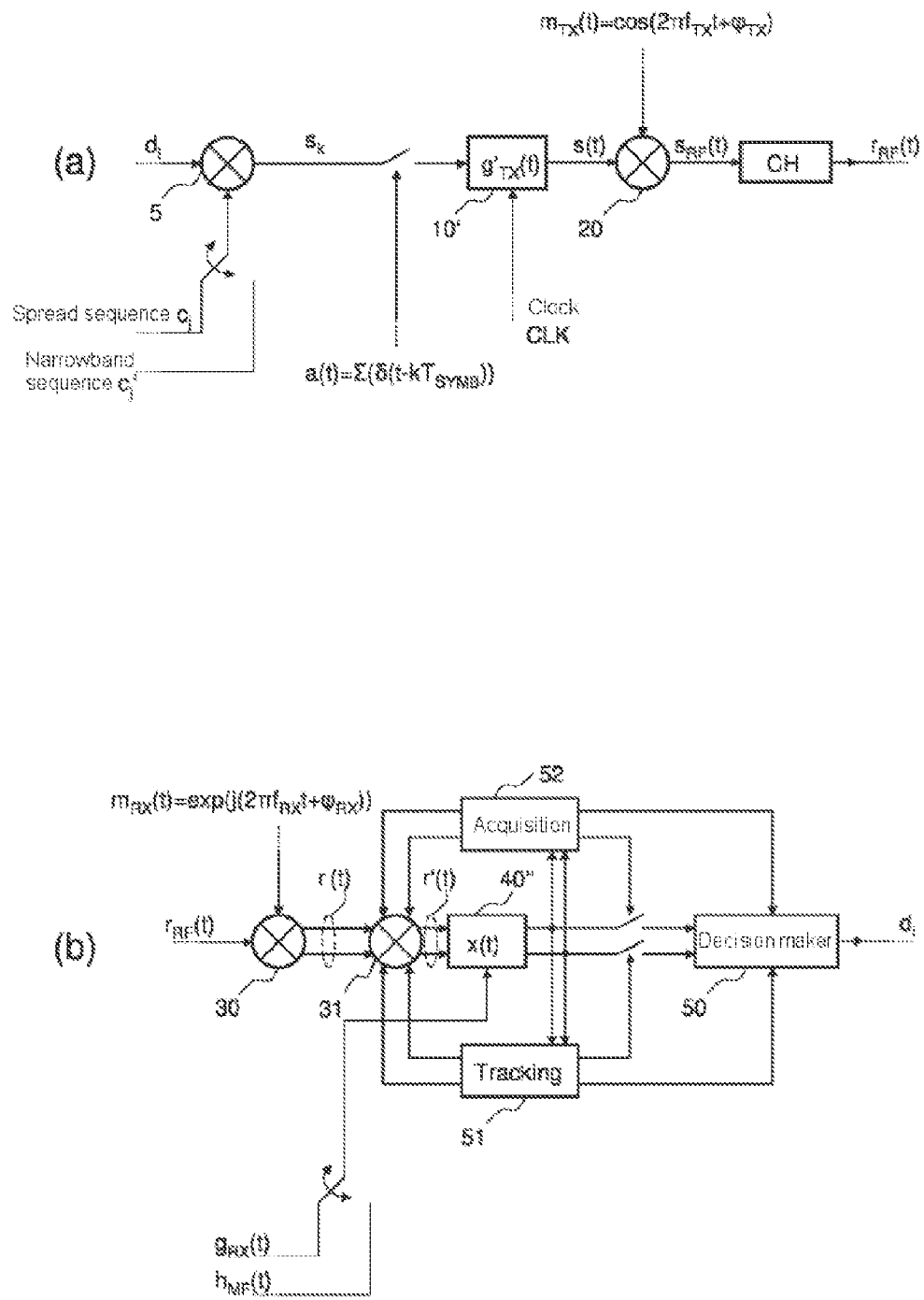
FIG. 3 is a block diagram with transmitter (a) and receiver (b) of a configurable DSSS transmission system according to teachings of the present disclosure.

The DSSS transmission system shown as a block diagram in FIG. 3 allows reconfiguration for the transmission of narrowband BPSK-modulated signals. Particularly the complex algorithms that the DSSS receiver contains are reused for narrowband reception. These afford very good performance, particularly in respect of their efficiency concerning clock and data recovery. In comparison with ordinary FSK narrowband receiver implementations, it is possible to achieve a sensitivity that is improved by up to 7 dB.

The transmission system shown in FIG. 3 essentially corresponds to the combination of the examples from FIG. 2a (transmitter) and FIG. 2c (receiver). At the transmitter end, however, the spread sequence $c_j$, $c_j'$ is in adjustable form. At the receiver end, the impulse response of the matched filter 40 can be set (on the basis of the spread sequence set in the transmitter). Optionally, it is also possible to set the symbol rate $T_{SYMBOL}$, which possibly also requires conditioning of the clock CLK for the transmission impulse filter 10. Otherwise, the statements in relation to the examples cited above apply accordingly. Optionally, it is possible to choose between different bandwidths for the channel filters (not shown).

The transmission system shown in FIG. 3 is thus usable in a simple manner both for wideband transmission (by means of DSSS method) and for narrowband transmission (e.g. using the BPSK method). This merely requires alteration of the spread sequence $c_j$ at the transmitter end and conditioning of the impulse response x(t) of the matched filter 40 at the receiver end.

The properties of the spread sequence $c_j$ are considered in more detail below. The properties of the autocorrelation function (AKF) of the spread sequence $c_j$ used have considerable influence on the spectral properties of the transmitted signal $s_{RF}(t)$ and the achievable performance parameters of the receiver.

Spread sequences that are optimally suited to DSSS transmission have an AKF having a steep and relatively high correlation peak, ideally approximately a Dirac impulse. Pseudorandom binary sequences (PRBS), for example what are known as maximum length sequences, have such autocorrelation properties and are therefore usually used as spread sequences $c_j$ for a spread spectrum transmission.

Firstly, a steep correlation peak at the transmitter end results in an optimum spectrum spread (power spectral density as constant as possible for the spread transmission signal s(t)), and secondly this allows optimum sensitivity and immunity toward inband interference sources to be achieved in the receiver.

In CDMA systems, what are known as gold sequences, for example, that is to say maximum length sequences linked to one another, are used for spectrum spreading that, although having less than optimum but usable AKF properties, additionally afford "good" suppression (that is to say good cross-correlation properties) in respect of other subscribers (with a different gold sequence). In general, the choice of the spread sequence is based on a wide variety of application and optimization aims, such as orthogonality, correlation properties, implementation complexity and also peak-to-average power ratio PAPR (PA design). The pseudorandom sequences (PRBS, pseudorandom binary sequences) and gold sequences cited here can be used for frequency spreading. Furthermore, a multiplicity of other spread codes are conceivable, however. Some spread codes require more complex signal processing rather than the simple multiplication of the input bit succession $d_i$ by a spread sequence that is shown in FIG. 2a. In general, all chip sequences that are suitable for a DSSS transmission method (i.e. for spectral spreading of the transmission signal) are called "spread sequences".

Figure 4:
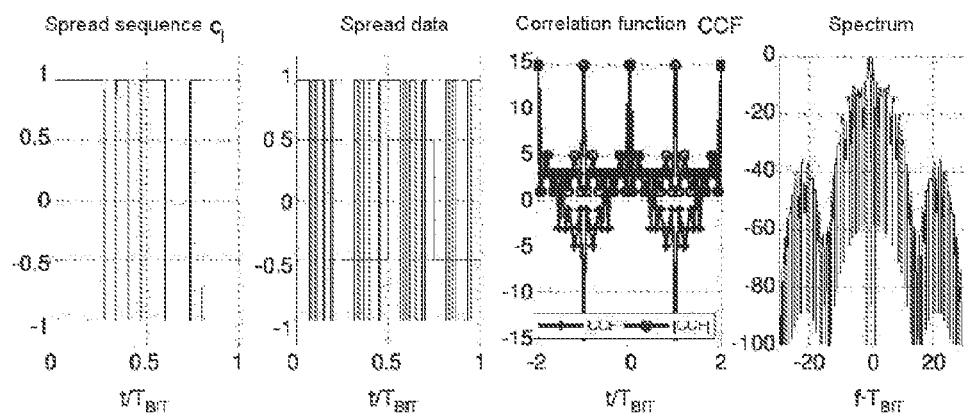
FIG. 4 shows various graphs relating to a pseudorandom spread sequence according to teachings of the present disclosure.

The left-hand graph in FIG. 4 shows a pseudorandom spread sequence (PRBS) $c_j$. The spread sequence $c_j$ comprises 15 elements (chips), in the present case (1, 1, 1, 1, −1, 1, −1, 1, 1, −1, −1, 1, −1, −1, −1). The second graph from the left shows the bit succession $d_i$=(1, −1, 1, −1) and also the resultant (spectrally spread) chip succession. This succession corresponds to the input signal succession $s_k$ of the transmission impulse filter 10' in FIG. 3.

The third graph shows the correlation between the received signal r(t) (cf. FIG. 3b) and the spread sequence $c_j$. From the absolute value of the correlation function CCF, it is possible to see the bit limits situated precisely at the points of the maxima in the correlation function. The fourth graph (far right) shows the spectrum of the spread transmission signal s(t). In the present example, a square-wave transmission impulse $g_{TX}(t)$ has been used. A different transmission impulse form (e.g. with a roll-off factor of 1) would heavily suppress signal components outside the frequency range denoted by the vertical lines.

Figure 5:
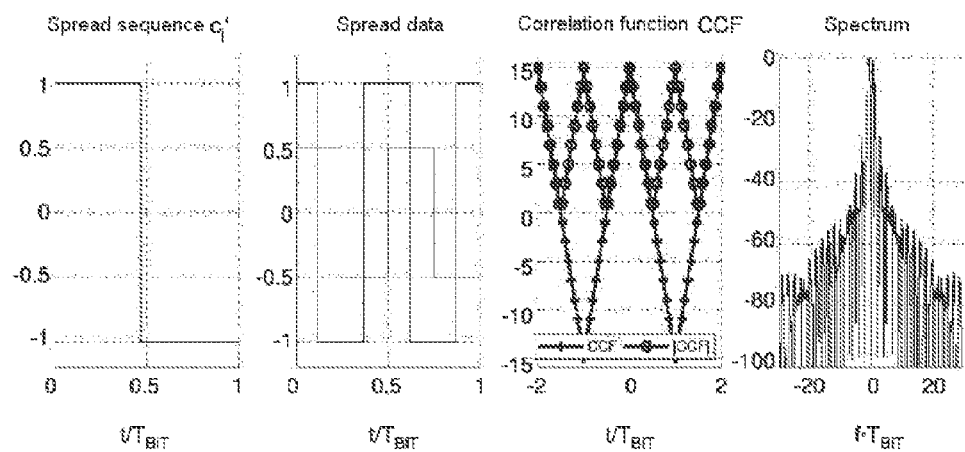
FIG. 5 shows various graphs relating to a narrowband sequence as a substitute for the spread frequency from FIG. 4 according to teachings of the present disclosure.

FIG. 5 shows the same four graphs for a narrowband chip sequence $c_j'$. On account of its narrowband nature, such a chip sequence is no longer suitable for a DSSS transmission and is therefore also not called a "spread sequence". In the present example, this is $c_j'$=(1, 1, 1, 1, 1, 1, 1, −1, −1, −1, −1, −1, −1, −1, −1). The succession $c_j$ thus contains precisely one hop from 1 to −1 between the 7 and 8 chips. The hop from 1 to −1 is therefore (almost) in the middle of the succession. The multiplication of the bit succession $d_i$ that is to be transmitted (in the present example 1, −1, 1, −1, scaled 0.5 in the illustration) by the chip sequence $c_j'$ achieves, de facto, Manchester coding of the bit succession $d_i$ (cf. FIG. 3), a "1" bit being coded with a falling edge and a "−1" bit being coded with a rising edge. The associated correlation function is triangular and the spectrum of the sent signal has a significantly narrower bandwidth than in the preceding example of FIG. 4.

A wideband spread sequence differs from a narrowband chip sequence at least in that, in the wideband spread sequence, at least two arithmetic sign changes are directly successive. By contrast, a narrowband chip sequence (suitable for a narrowband transmission) does not have two successive arithmetic sign changes. That is to say that a narrowband chip sequence contains neither the succession {1, −1, 1} nor the succession {−1, 1, −1}. The narrowband chip sequence also does not contain an arithmetic sign change after the first and before the last chip. That is to say that the sequences {1, 1, 1, 1, 1, 1, −1} and {−1, −1, −1, −1, −1, −1, 1} are also not narrowband on the basis of this criterion, even though only one arithmetic sign change occurs. For the assessment of this distinguishing criterion, the sequence $c_j$ can be continued cyclically (as already mentioned, j is equal to k mod $L_C$).

Figure 6:
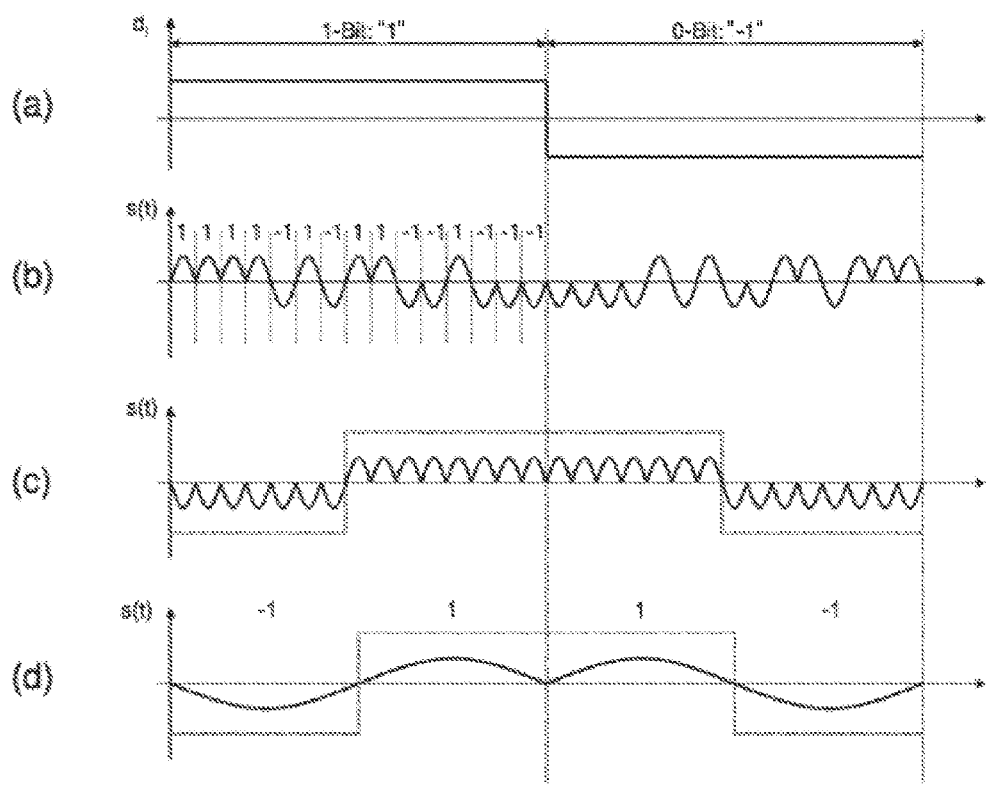
FIG. 6 shows timing diagrams of a BPSK transmission method with symmetric Manchester coding through suitable choice of a narrowband spread sequence and at a reduced symbol rate according to teachings of the present disclosure.
Figure 7:
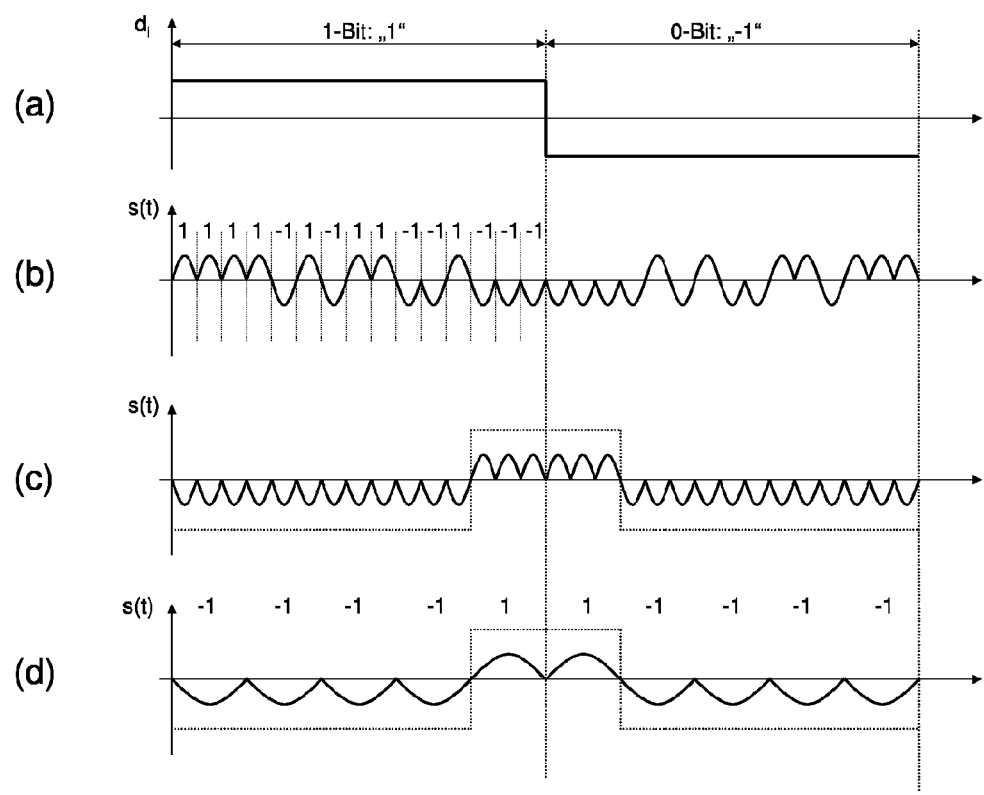
FIG. 7 shows timing diagrams of a similar BPSK transmission method to that in FIG. 6, but with asymmetric Manchester coding according to teachings of the present disclosure.

In the case of "genuine" spread sequences, transmitter-end reduction of the chip rate is therefore not possible (cf. explanation for FIGS. 6 and 7). Narrowband chip sequences allow reduction of the symbol rate (cf. explanation for FIGS. 6 and 7) anyway, since two or more successive like chips (i.e. two or more successive "1" chips or "−1" chips) can be combined at the transmitter end to form one symbol. In the previous example of symmetric Manchester coding with the chip sequence {1, 1, 1, 1, 1, 1, 1, −1, −1, −1, −1, −1, −1, −1, −1}, one symbol (i.e. an impulse response $g_{TX}(t-k \cdot T_{SYMB})$) can be sent for the seven "1" chips and one symbol (i.e. an impulse response $-g_{TX}(t-k \cdot T_{SYMB})$) can be sent for the eight "−1" chips, which leads to a reduction in the symbol rate from 600 kbaud to 80 kbaud.

When the (pseudorandom) spread sequence $c_j$ is used, the signal energy is distributed over large portions within the frequency range denoted by the vertical lines, while the energy in the case of Manchester-coded bits is distributed essentially around the coordinate origin ($f \cdot T_{BIT}=0$). Given appropriate conditioning of the impulse response x(t) of the matched filter 40'', the DSSS receiver can also be used for receiving narrowband signals, provided that correspondingly narrowband chip sequences are used at the transmitter end, for example a hopping sequence as shown in the left-hand graph in FIG. 5. The specific implementation of the DSSS transmitter (FIG. 3a) and particularly that of the DSSS receiver (FIG. 3b) is of no great significance in this case. As will be explained later, however, the use of narrowband chip sequences (when they no longer spread the spectrum) allows a significant reduction in the baud rate (modulation symbol rate) at the transmitter end (in comparison with the "normal" DSSS mode).

The receiver shown in FIG. 3b shows e.g. a single-stage frequency conversion from the RF band to baseband. However, two—or multistage mixing is also possible. Different components of the transmitter or of the receiver can optionally be implemented by software that is executed by suitable signal processors. The radio frequency front end of the transmitter and of the receiver will normally be implemented using analog technology.

In narrowband mode, in the case of a DSSS transmitter as shown in FIG. 3a, the transmitter can be operated at a significantly reduced symbol rate (baud rate), for example when a stepped chip sequence $c_j'$ is used. This allows a further reduction in the bandwidth of the spectrum of the transmission signal s(t) or $s_{RF}(t)$. FIG. 6 shows, inter alia, the DSSS transmission of two bits and of a 15-fold spread (spread sequence having 15 chips) using timing diagrams. In the present example, a DSSS transmission system as shown in FIG. 3 is assumed, which operates with a symbol rate of 600 kbaud (600 000 chips per second) and a spread factor $L_C$ of 15.

The diagram in FIG. 6a shows the two bits $d_i = \{1, -1\}$, where a "logic 0" is represented by −1 and a "logic 1" is represented by +1. Diagram (b) shows the resultant transmission signal s(t) when a pseudorandom spread sequence is used, in the present case {1, 1, 1, 1, −1, 1, −1, 1, 1, −1, −1, 1, −1, −1, −1}. In accordance with the polarity of the bit that is to be transmitted, the aforementioned spread sequence is transmitted in inverted or uninverted form, a corresponding signal with the appropriate polarity being produced for each chip. In this case, the symbols correspond to the impulse response $g'_{TX}(t-k \cdot T_{CHIP})$ of the transmitter-end filter (see FIG. 3a, filter 10), and the sum of all the pulses yields the transmission signal s(t) shown in the diagram in FIG. 6b. The spectrum of the resultant transmission signal s(t) has a relatively wide bandwidth in accordance with the spectral properties of the pseudorandom spread sequence.

The diagram in FIG. 6c shows the same situation as in FIG. 6b with the difference that the chip sequence $c_j$ used is not a (pseudorandom and therefore wideband) spread sequence, but rather has the profile of a hopping function. That is to say that the pseudorandom spread sequence $c_j = \{1, 1, 1, 1, -1, 1, -1, 1, 1, -1, -1, 1, -1, -1, -1\}$ is replaced by the narrowband chip sequence $c_j' = \{-1, -1, -1, -1, -1, -1, -1, 1, 1, 1, 1, 1, 1, 1, 1\}$. In the present example, the narrowband chip sequence accordingly consists of seven successive "−1" chips and eight successive "1" chips, with a corresponding signal (corresponding to the impulse response of the filter 10) being produced for each chip. The specific choice of chip sequence $c_j'$ (seven "−1"s and eight "1"s) prompts almost symmetric Manchester coding of the bits that are to be transmitted. This slight asymmetry can be tolerated at the receiver end. According to the diagram from FIG. 6c, however, 15 symbols are transmitted as in the case of the DSSS transmission. A further reduction in the bandwidth is achieved if the symbol rate is reduced accordingly. In the present case of symmetric Manchester coding, the symbol rate can be reduced from the aforementioned 600 kbaud to 80 kbaud (80 000 chips per second) if only two symbols are now transmitted per bit. This merely requires the transmitter end to increase the sampling period $T_{SYMB}$ (see FIG. 3a) as appropriate and to reduce the clock rate for the (digital) filter 10 as appropriate. An impulse $g_{TX}(t)$ produces a correspondingly spread impulse $g''_{TX}(t) = g_{TX}(t/R)$, where R corresponds to the factor by which the baud rate is reduced, in the present case R=600/80=7.5. Groups of "1" chips are combined to form a first symbol, and groups of "−1" chips are combined to form a second symbol. For each symbol, a corresponding impulse $g''_{TX}(t)$ is then sent. As already mentioned above, the groups of chips that are each combined to form a symbol do not necessarily have to be of the same size (i.e. have the same number of chips). It suffices if the groups have approximately the same number of chips (seven "−1"s and eight "1"s). The magnitude that the imbalance may have is dependent on the respective implementation. The chip sequence is thus decimated as appropriate without the signal profile thereof being significantly changed. At the receiver end, it is possible to use the same algorithms as in the DSSS mode (i.e. with pseudorandom spread sequence). That is to say that the receiver continues to operate at the full symbol rate that is necessary for wideband DSSS transmission (in the present example 600 kbaud). As already mentioned, the receiver end merely requires conditioning of the impulse response of the matched filter 40" (see FIG. 3b).

FIG. 7 shows the same diagrams as FIG. 6, but for the case of asymmetric Manchester coding of the bits that are to be transmitted. In the present example, the narrowband chip sequence is $c_j = \{-1, -1, -1, -1, -1, -1, -1, -1, -1, -1, -1, -1, 1, 1, 1\}$. The resultant transmission signal without symbol rate reduction is shown in FIG. 7c. In a similar manner to the preceding example, the symbol rate can be reduced at the transmitter end. Instead of 15 chips, five symbols are now sent per bit (see FIG. 7d), meaning a symbol rate reduced to 200 kbaud. In the case of a stepped spread sequence, the baud rate can be reduced at least by the greatest common divisor (in the present example 3) from the number of "−1" chips (in the present example 12) and the number of "1" chips (in the present example 3).

Figure 8:
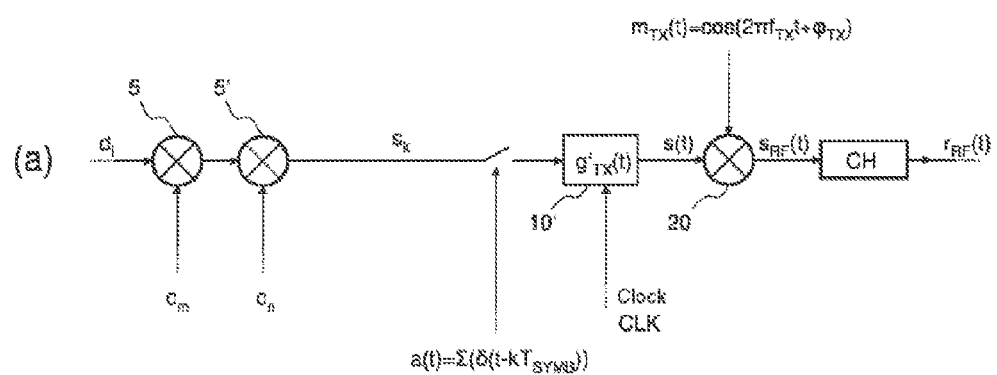
FIG. 8 shows a block diagram of a transmitter for the application of concatenated spreading using two spread sequences according to teachings of the present disclosure.

The use of a narrowband chip sequence (instead of a wideband spread sequence) that is shown in the preceding examples and a correspondingly reduced symbol rate can also be used when concatenated spread schemes are used. An example of a suitable transmitter is shown in FIG. 8. In DSSS mode, e.g. two pseudorandom sequences $c_n$ (inner sequence) and $c_m$ (outer sequence) are used.

For narrowband mode, the inner sequence is filled with "1" or "−1" in particular constantly (that is to say fifteen "1"s or fifteen "−1"s), while the outer sequence, as in the preceding example, is chosen with a chip sequence for symmetric or asymmetric Manchester coding, for example.

A reduction in the symbol rate (in comparison with the wideband DSSS mode) is then possible, beyond the inner spread, to
a value that is required for synchronization to the narrowband outer sequence.

By way of example, in the case of a 15×15—fold concatenated spread, the symbol rate of, by way of example, 600 kchip/s can be reduced by the factor 75 (15×5) at the transmitter end (8 kchip/s), provided that at the receiver end the inner chip sequence is chosen to be constant as "+1" or "−1" and the outer chip sequence is chosen as {1, 1, 1, 1, 1, 1, 1, 1, 1, 1, −1, −1, −1, −1, −1} (ten "1"s followed by five "−1"s), for example. According to the present example, the DSSS receiver first of all uses the acquisition unit (see e.g. FIG. 3b) to synchronize itself to the inner spread sequence $c_n$ and then to the outer spread sequence $c_m$. To this end, before the actual data (the payload), a range with single spreading (using the inner chip sequence) and a range with dual spreading (that is to say in concatenated form), for example, are sent at the same chip rate, for example, the respective data of which consist of training sequences that are known to the receiver.

Since the inner sequence is filled with "1" or "−1" constantly, the acquisition relating to the inner chip sequence $c_n$ may possibly not produce any information about the bit limits. However, it is at least possible to determine the frequency error $f_E$ of the received signal (for the purposes of the accuracy of the acquisition for the inner spread).

LIST OF REFERENCE SYMBOLS

5 Multiplier (spread)
10, 10' Filter (transmitter end)
20 Mixer (transmitter-end frequency conversion)
30 Mixer (receiver-end frequency conversion)
31 Mixer (receiver-end frequency correction)
40, 40' Matched filter (receiver end)
40" Filter (receiver end)
50 Decision maker unit 51 Tracking unit
52 Acquisition unit
$d_i$ Bit succession (i=⌊k/$L_C$⌋)
k Time index (k=1, 2,
$L_C$ Sequence length
j Sequence index (j=k mod $L_C$)
$s_k$ Chip succession
s(t) Transmission signal (baseband)
$s_{RF}$(t) Transmission signal (RF band)
$r_{RF}$(t) Received signal (RF band)
r(t) Received signal (baseband)
$g_{TX}$(t) Impulse response
$g_{RX}$(t) Impulse response
$h_{MF}$(t) Impulse response
x(t) Impulse response
δ(t) Dirac function
$f_{TX}$ Transmitter-end carrier frequency
$f_{RX}$ Receiver-end carrier frequency
$φ_{TX}$ Transmitter-end carrier phase
$θ_{RX}$ Receiver-end carrier phase

What is claimed is:

1. A system providing a spread spectrum and a narrowband data transmission, the system comprising:
   a direct sequence spread spectrum (DSSS) transmitter converting a bit succession ($d_i$) to be transmitted into a chip succession ($s_k$) using a chip sequence ($c_j$, $c_j'$) and to send a succession of impulses (s(t)) corresponding to the chip succession ($s_k$); and
   a DSSS receiver using a transmission channel to receive impulses (s(t)) sent by the transmitter, and to filter the received impulses (r(t)) using a filter having an impulse response (x(t)) dependent on the chip sequence ($c_j$, $c_j'$),
   wherein for the spread spectrum data transmission the chip sequence ($c_j$) is a spread sequence; and
   wherein for the narrowband data transmission a chip sequence ($c_j'$) and a corresponding impulse response (x(t)) of the filter are set, wherein the chip sequence ($c_j'$) never comprises a succession having two directly successive arithmetic sign changes nor an arithmetic sign change between the first and second chip or immediately before the last chip in the chip sequence ($c_j'$);
   the DSSS transmitter is designed to transmit the succession of impulses at an adjustable symbol rate ($T_{SYMB}^{-1}$);
   the symbol rate for a spread spectrum data transmission corresponds to a prescribable first symbol rate ($T_{CHIP}^{-1}$); and
   the symbol rate for a narrowband transmission corresponds to a prescribable second symbol rate, which is reduced in comparison with the first symbol rate ($T_{CHIP}^{-1}$), and only one corresponding impulse ($g''_{TX}$(t)) is sent for each of a plurality of like successive chips, so that groups of chips having the same arithmetic sign are combined to form symbols.

2. The system as claimed in claim 1, wherein the spread sequence ($c_j$) is a pseudorandom chip sequence or is a chip sequence derived from one or more pseudorandom chip sequences.

3. The system as claimed in claim 1, wherein the spread sequence ($c_j$) has two successive arithmetic sign changes at least once.

4. The system as claimed in claim 1, wherein in the case of narrowband data transmission the chip sequence ($c_j'$) is a hopping sequence.

5. The system as claimed in claim 1, wherein in the case of narrowband data transmission the chip sequence ($c_j'$) is an asymmetric hopping sequence.

6. The system as claimed in claim 1, wherein in the narrowband data transmission the chip sequence ($c_j'$) has a prescribable number of chips, a first portion of which is allotted to a contiguous succession of "1"s and a second portion of which is allotted to a contiguous succession of "−1"s.

7. The system as claimed in claim 6, wherein the second symbol rate is adjustable such that two symbols are transmitted for each bit that is to be transmitted, thus achieving symmetric Manchester coding for the bits that are to be transmitted.

8. The system as claimed in claim 1, wherein:
   for each symbol an impulse ($g''_{TX}$(t)) is sent and the sent impulses ($g''_{TX}$(t)) have the same width, and
   the groups of chips that are combined to form a symbol have approximately the same number of chips.

9. A system comprising:
   a direct sequence spread spectrum (DSSS) transmitter for converting a bit succession ($d_i$) that is to be transmitted into a chip succession ($s_k$) using a chip sequence ($c_j$, $c_j'$) and to send a succession of impulses ($g''_{TX}$(t)) that corresponds to the chip succession ($s_k$), the DSSS transmitter;
   wherein the DSSS transmitter is configurable for a spread spectrum mode and a narrowband mode;
   the spread spectrum mode chip sequence ($c_j$) is a spread sequence, and
   the narrowband mode a chip sequence ($c_j'$) never comprises a succession having two directly successive arithmetic sign changes nor an arithmetic sign change between the first and second chip or immediately before the last chip in the chip sequence ($c_j'$);
   wherein the DSSS transmitter is further configured to transmit the succession of impulses at an adjustable symbol rate ($T_{SYMB}^{-1}$), wherein the symbol rate in the spread spectrum mode corresponds to a prescribable first symbol rate ($T_{CHIP}^{-1}$) and wherein the symbol rate in the narrowband mode corresponds to a prescribable second symbol rate, which is reduced in comparison with the first symbol rate ($T_{CHIP}^{-1}$), and only one corresponding impulse ($g''_{TX}$(t)) is sent for each of a plurality of like successive chips, so that groups of chips having the same arithmetic sign are combined to form symbols.

10. A system as claims in claim 9, further comprising a DSSS receiver for receiving signals that are sent using a transmitter as claimed in claim 9, the receiver comprising:
   a filter having an adjustable impulse response (x(t)) to which the impulses (r(t)) received from the transmitter are supplied; and
   the input response (x(t)) of the filter adjustable on the basis of the chip sequence set at the transmitter end.

* * * * *